(12) United States Patent
Millett et al.

(10) Patent No.: US 7,672,852 B2
(45) Date of Patent: Mar. 2, 2010

(54) LOCALIZATION OF PROMPTS

(75) Inventors: Thomas W. Millett, Seattle, WA (US); David T. Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 11/238,521

(22) Filed: Sep. 29, 2005

(65) Prior Publication Data
US 2007/0073544 A1 Mar. 29, 2007

(51) Int. Cl.
*G10L 21/00* (2006.01)
(52) U.S. Cl. ............... 704/277; 704/7; 704/3
(58) Field of Classification Search ............ 704/1, 704/3, 7–10, 277, 4, 270, 272; 455/456.3; 702/123; 707/203, 205
See application file for complete search history.

(56) References Cited

U.S. PATENT DOCUMENTS

| 5,724,272 | A  | * | 3/1998  | Mitchell et al. ............. 702/123 |
| 6,188,985 | B1 |   | 2/2001  | Thrift et al. |
| 6,434,524 | B1 |   | 8/2002  | Weber |
| 6,499,021 | B1 |   | 12/2002 | Abu-Hakima |
| 7,398,215 | B2 | * | 7/2008  | Mesbah et al. ............. 704/277 |
| 2005/0009538 | A1 | * | 1/2005 | MacKay et al. .......... 455/456.3 |

* cited by examiner

*Primary Examiner*—Huyen X. Vo
(74) *Attorney, Agent, or Firm*—Senniger Powers LLP (57) ABSTRACT

Localized prompt statements. For each prompt statement to be executed, identifying a resource string that corresponds to a variable associated with the prompt statement permits retrieval of one or more localized media files. For example, the media files may provide for playing spoken prompts in a localized language. Executing the prompt statement includes rendering the retrieved media files. In one aspect, the localized prompt statements contain both text and numeric values wherein a spoken prompt is grammatically correct for the numeric value contained in the prompt.

15 Claims, 2 Drawing Sheets

LOCALIZATION OF PROMPTS

BACKGROUND

Computer applications are often written for ultimate sale in multiple markets of different languages. In applications requiring audio interaction with the end-user of the application, such as telephonic voice prompts, audio prompts and written phrases may be necessary to be translated in the language of the end-user.

When writing a program to execute audio prompts, such as a voice menu that a user can access over a telephone, a program must contain written phrases that can be converted to voice statements through the use of a "Text-to-Speech" program. Thus, a foreign language phrase would have to be correctly written in the proper grammatical order in a program to make sense to a user hearing the voice prompt when the written phrase is converted from text to speech. Audio prompt programs also often contain professionally recorded phrases wherein an individual speaking a particular language would have his or her voice recorded for each phrase that is necessary in the operation of a telephonic menu. For example, a voice mail program may have the phrases, "You have" and "new messages" prerecorded for the use in a telephonic menu that plays the audio prompt, "You have" {0} "new messages" wherein {0} is either a pre-recorded number or a text-to-speech of a numeric value.

Problems can occur in audio prompt programs when the program is used in markets having different languages. The written phrases used for both text-to-speech conversions as well as the voice prompts that are recorded from the written phrases would have to be properly translated and placed in the grammatically correct order if the audio prompt is to make sense to a telephone user listening to it. Coding multilingual prompts within an application can pose a serious burden to both the programmer and the translator. For the programmer, coding multilingual written phrases of the audio prompts can require a significant amount of time to enter phrases in a language that is foreign to the programmer. Additionally, in applications that are intended to be used in many different languages, the coding of written phrases and the inclusion of the various pre-recorded audio prompts for each additional language can significantly increase the overall size of the program. For the translator, translating written phrases to a local foreign language can require some knowledge of the computer language the application is being written in, an understanding of the code structure of the program, and specific coding techniques that a translator may not be well versed in.

Coding localized language phrases within a program can also greatly introduce errors into the program. The computer programmer is more likely to code misspellings and grammatical errors when coding phrases in a language that is foreign to the programmer. Conversely, if a translator codes the phrases in the program to avoid misspellings and grammatical errors, the translator is more likely to enter code errors into a program when the translator only nominally understands the programming process or the overall architecture of the program's structure.

In addition to the burdens upon the programmer and translator, hard-coding foreign language phrases and incorporating media files of pre-recorded audio prompts within a program causes the program, upon completion, to be inflexible to the addition of new languages without recompiling. Thus, it may be economically prohibitive to add a new language to an application where the market requiring the new language is not enough to justify the costs of entering additional code and recompiling the program.

SUMMARY

One or more deficiencies of the known art are overcome by improved localization of prompt statements. In one aspect of the invention, computer code providing instructions for playing prompt statements is separate from language-localizable prompt statement resource string files and media files. By separating computer code from resource string files and media files, computer code may be utilized to play prompts of any number of different languages without requiring modification or recompiling of the code for each local language. Beneficially, a computer programmer is not required to understand or hard-code specifics of foreign language spelling and grammatical rules into a program that is utilized in many different languages. Additionally, a translator that is translating resource string files and recording foreign-language audio prompt media files is not required to understand the specifics of how the computer code is written.

In one aspect of the invention, resource strings and media files are not hard-coded into the program code, but are separately maintained in resource string files and media file databases that are accessible to local language translators. Searching for a file that is not specific to any single language but is generic to all languages permits a translator to easily translate prompt statement resource strings to a specific foreign language for localizing the prompt statements. Moreover, recording media files for spoken prompts that are not hard-coded in the actual computer-executable code of the application permits improved localization.

In another aspect, the spoken prompts contain both text and numeric values. Advantageously, the numeric value may be used to play grammatically correct prompts.

Alternatively, aspects of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
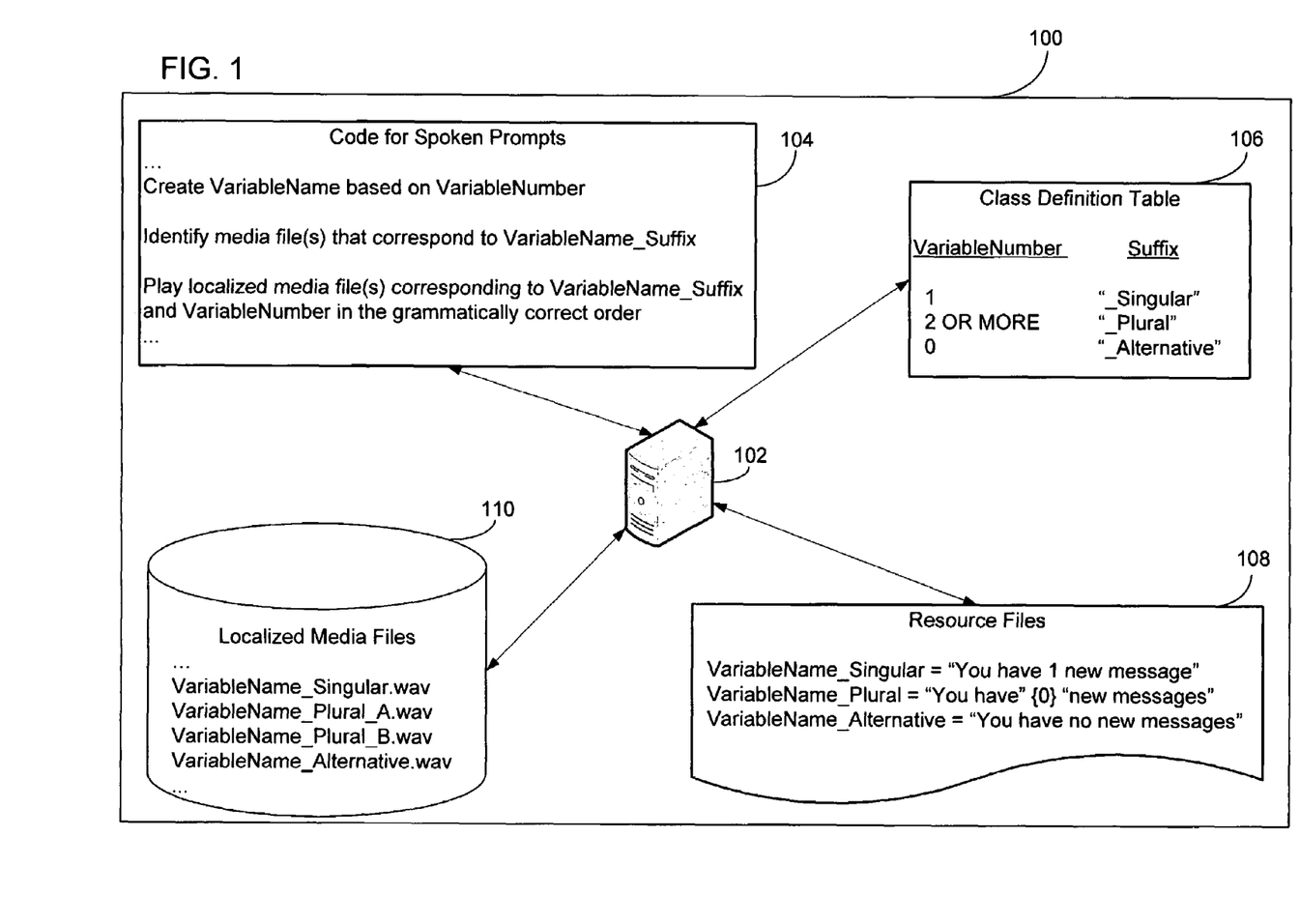
FIG. 1 is an exemplary block diagram illustrating one embodiment of a suitable system of the present invention.

Referring first to FIG. 1, a block diagram illustrates an exemplary embodiment of a system in which one embodiment of the present invention may be implemented. A system 100 has computer 102, computer-executable code 104, class definition table 106, resource files 108, and localized media files 110. Computer 102 executes code 104 that specifies a method for rendering prompts (e.g., playing audio files representative of spoken prompts). System 100 advantageously enables resource strings and media files to be separately and individually modified or translated to a localized language without affecting any modifications to code 104. This significant advantage permits code 104 to be written once by programmers for use in a number of different localized languages. Once code 104 is created and resource strings are created in a particular language (e.g., English), translators can review the resource strings and provide localized translations of the resource strings (e.g., French). The translations are then saved in the localized resource files for the French language. Likewise, the translators can record spoken media clips of the resource strings and resource string fragments in the localized language (e.g., French) and save the recordings as localized media files that are accessed by computer 102 when playing localized media clips as called out by code 104.

For example, code 104 specifies creating a name (e.g., "Messages") assigned to VariableName based upon the value assigned to a KEY variable. Computer 102 accesses class definition table 106 to identify a grammar variable (e.g., "_Plural") that corresponds to the value of the KEY variable. Code 104 creates a new name (e.g., "Messages_Plural"), assigns the new name to VariableName, and instructs computer 102 to identify media files that correspond to the VariableName (i.e., "Messages_Plural"). Computer 102 accesses resource files 108 and locates the resource string that corresponds to VariableName. Computer 102 analyzes the resource string and determines the media file(s) that correspond to the resource string and the order of the media file(s) in the resource string. Computer 102 accesses the media file(s) that correspond to the resource string from localized media files 110. Code 104 then instructs computer 102 to render the localized media files in the grammatically correct order that is identified in the resource string.

In one embodiment, the class definition table 106 contains a grammatical variable may be a prefix, suffix, or combination thereof. The grammatical variable is then appended to the name assigned to VariableName such that it corresponds to the grammatically correct resource string resource file associated with the numeric value of KEY. For example, if the value of KEY is "1", then the associated resource string would be a string that is grammatically correct for a singular value (e.g., "You have 1 new message"). If the value of KEY is "5", then the associated resource string would be a string that is grammatically correct for a plural value (e.g., "You have 5 new messages"). Alternatively, if the value of KEY is "0", then the associated resource string would be a string that is grammatically correct for a zero or null value (e.g., "You have no new messages").

In another embodiment, resource strings located in resource files 108 are separate from code 104 and may be translated by local language translators to a non-English language without requiring code 104 to be modified or recompiled. During translation, the resource string and numeric variables may be translated to a local language and the resource string and numeric values may be rearranged in a grammatically correct order for the translated language. For example, the grammatically correct order and tense for the English resource string, "You have" {0} "new messages," contains the two text fragments "You have" and "new messages" where in this example "{0}" is a plural numeric value. If the resource was translated into French, however, one grammatically correct order and tense may be, {0} "nouveau messages sont arrivés," wherein the numeric variable is located at the beginning of the sentence stating two or more messages were received.

In yet another embodiment, the media files comprise localized recordings of resource strings and resource string fragments that correspond to the resource strings. The media files may also be recorded and utilized by code 104 without requiring code 104 to be modified or recompiled.

Figure 2:
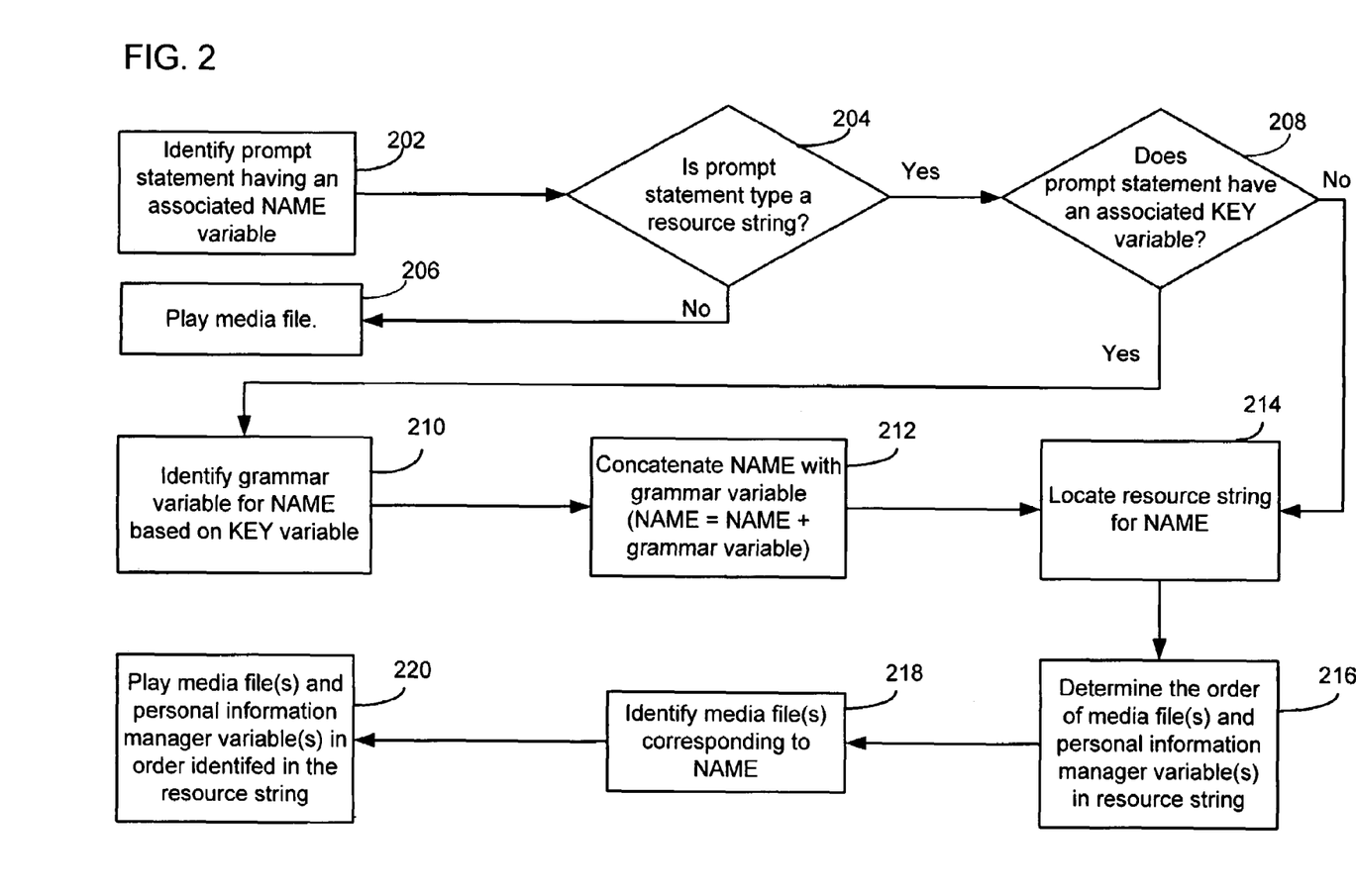
FIG. 2 is an exemplary flowchart of a method of playing localized prompt statement.

FIG. 2 provides a flowchart illustrating an exemplary method of one embodiment of the present invention. The method is initiated when a prompt statement having an associated NAME variable is identified at 202. At 204, a determination is made if the prompt statement type is a resource string. If the prompt statement is not a resource string, the prompt statement media file is played at 206.

If the prompt statement is determined to be a resource string at 204, a determination is made whether a KEY variable is associated with the prompt statement at 208. If the prompt statement has an associated KEY variable, a Grammar Variable is identified based upon the value of the KEY variable at 210. The NAME variable of the prompt statement is concatenated with the Grammar Variable to form a new NAME variable which is assigned to NAME (e.g., MESSAGES=MESSAGES+_Plural) at 212. In one embodiment, the Grammar Variable is concatenated as a suffix to the NAME variable. In another embodiment, the Grammar Variable is concatenated as a prefix to the NAME variable. In still another embodiment, the Grammar Variable is concatenated as a combination of a prefix and a suffix to NAME variable. For example, if the value of KEY is "1", the Grammar Variable is assigned a designation for a singular number (e.g., "_Singular"). If the value of KEY is a plural value, such as "5", then the Grammar Variable is assigned designation for a singular number (e.g., "_Plural"). Alternatively, if the value of KEY is "0" or a null value, then the Grammar Variable is assigned a designation for an alternative value (e.g., "_Alternative"). In this example, if the Grammar Variable is concatenated as a suffix, the NAME variable would be assigned either the value "MESSAGES_Singular," "MESSAGES_Plural," or "MESSAGES_Alternative," depending upon whether the value of KEY is "1", a plural number, or "0", respectively.

At 214, a resource string that is associated with the NAME variable is located. The resource string can comprise a text string, two or more text strings, a numeric variable, a text variable, an alphanumeric variable, and combinations thereof. For example, a resource string can be a single text string such as, "You have no new messages." The resource string can also include a combination of one or more text strings and a numeric value. For example, "You have" {0} "new messages," wherein the resource string includes the text fragments "You have" and "new messages" that are separated by variable {0}. The variable {0} is a place holder that is later replaced with the value assigned to the KEY variable.

The resource string associated with the NAME variable is analyzed for the number of text fragments, the number of personal information manager variables, and the order of each in the resource string is determined at 216. A media file associated with each text fragment contained in the resource string for the NAME variable is located at 218. At 220, the media file associated with each text fragment contained in the resource string associated with the NAME variable is played in the order identified in the resource string file. The media files would be played in their recorded format while the personal information manager variables would be played in a "Text-to-Speech" format.

In one embodiment, the name of the media format file is the name assigned to the NAME variable (e.g., "MESSAGES_Singular.wav" for a wave file associated with the resource string "MESSAGES_Singular"). In another embodiment where two or more text fragments are contained in the resource string, the names of the media files are the names assigned to the NAME variable and a sequence designating character that identifies if the media file is the first, second, or other media file in the resource string. For example, if the resource string associated with MESSAGES_Plural contains two text fragments separated by a number variable, such as "You have" {0} "new messages", the media file for the first fragment "You have" could be MESSAGES_Plural.1.wave, MESSAGES_Plural.A.wav, and the like. The media file for the second fragment "new messages" could be MESSAGES_Plural.2.wave, MESSAGES_Plural.B.wav, and the like. By using naming criteria such as the above examples, the translators can translate the words of the resource string files and media files, change and rearrange the order of the text string and media fragments, and so forth as is necessary to provide a grammatically correct localized translation of the resource strings and media files without requiring the application code to be revised or recompiled.

In another embodiment, resource strings that contain two or more numeric variables, text variables, or combinations thereof, may be played. Examples of such a resource string would include a message such as, "Unread message from [Sender Name]. Subject reads [Subject]. Received [Received Date and Time]." In this example, "Sender Name," "Subject," and "Received Date and Time" are personal identification manager variables that are text and alphanumeric string values that correspond to a specific message received by a personal information manager application. In this embodiment, however, the resource string does not contain a KEY variable and therefore does not require that the resource string be grammatically modified due to the plurality of the KEY value. Thus, at 208 a determination is made that the prompt statement does not have an associated KEY value.

At 214, the resource string for the NAME variable is located. At 216, the resource string is analyzed, and the position of the media files and the personal information manager variables are identified. As described above, the resource string can be a text string, one or more text strings, a numeric variable, a text variable, an alphanumeric variable, and combinations thereof. In this example, the resource string contains three text fragments and three personal information manager variables. Thus, the resource string would appear as, "'Unread message from' {0} 'Subject reads' {1} 'Received' {2}." From the resource string, the method would determine that three text fragments and three personal information manager variables are present wherein each text fragment is followed by a personal information manager variable. The variable placeholders {0}, {1}, and {2} are related to the personal information manager variables [Sender Name], [Subject], and [Received Date and Time], respectively.

The media file associated with each text fragment contained in the resource string for the NAME variable is located at 218. At 220, the media files would be played in their recorded format while the variables (e.g., [Sender Name], [Subject], and [Received Date and Time]) would be played in a "Text-to-Speech" format in the order identified in the resource string.

In another embodiment, multiple media files and variables are sequentially played at 220 when multiple categories of personal information manager information are identified. For example, if personal information manager information includes two new voicemail messages and four new email messages, the resource string "You have" {0} "new voicemail messages and" {1} "new email messages." The process for playing multiple audio prompts is an extension of the process that is followed above. Resource strings are created which incorporate multiple audio prompts in the correct grammatical order. For example, the concatenated variable "MESSAGES_Singluar_Plural may include the resource string, "You have " {0} " new voice message and {1} "new email messages" wherein the voice message is singular and the email messages are plural. Similarly, the variable "MESSAGES_Plural_Plural" may include the resource string, "You have" {0} "new voice messages and {1} "new email messages" wherein both the voice messages and the email messages are plural. Similar to the method described above, the resource string is analyzed at 216, and the position of the media files and the variables are identified. From the resource string, the method would determine that three text fragments and two variables are present wherein each text fragment is separated by a variable. The variable placeholders {0} and {1} are associated with the personal information manager variables [Voicemail Messages] and [Email Messages], respectively, wherein in this example [Voicemail Messages] would contain the value "2" and [Email Messages] would contain the numeric value "4." At 220, the media files would be played in their recorded format while the variables would be played in a "Text-to-Speech" format in the order identified in the resource string.

In one embodiment, when a media file is not able to be located at 218 for a text fragment identified in the resource string, the text fragment identified in resource string is played in a "Text-to-Speech" format at 220.

In another embodiment, the media file is a localized audio recording representative of the resource string.

In another embodiment, the localized language of the media file and resource string file is a non-English language.

In yet another embodiment, the resource string file and/or the media file comprise personal information manager information. The personal information manager information may be information selected from the group consisting of email messages, voicemail messages, calendar appointments, and personal contact details.

The following examples further illustrate aspects of the invention.

EXAMPLE 1

Exchange Unified Messaging (Microsoft Corporation, Redmond, Wash.) is a software application that can play personal information manager (PIM) information such as email messages, voicemail messages, calendar appointments, and personal contact details to it's users over the telephone.

This PIM information is conveyed to the user through spoken statements, for example: "You have 5 new messages" is played over the telephone to the user. Statements can be composed of 2 kinds of parts: pre-recorded prompt fragments and variables. In the previous example, "You have" and "new messages" are pre-recorded prompt fragments that are on disk as audio files (e.g., wave files or .wav files). "5" is a variable in the previous example that comes from counting the number of new messages in the PIM information. A variable is something that can change every time the statement is spoken. It could be the name of the sender, the subject field of an email, or even the body of an email message. Often, it is unlikely that the system will have pre-recorded audio files for variables.

Applications that play statements tend to explicitly specify the placement of the individual fragments within the code. Consider the following XML code example for playing the statement "You have 5 new messages". Note that this may apply to XML code as well as any other implementation code.

```
Prompt (type, name)   // Prompt is a function call that will play the target
                      // Type can be either "Wave file" or the kind of variable to be played
                      // name can be a wave file name or a variable name
In XML Code:
<!-Comment // 5000.wav contains spoken text "You have">
<!-Comment // 5005.wav contains spoken text "new messages">
<!-Comment // NumNewMessages is a variable containing the number of new messages the
user has received.>
     <Prompt type = "wave" name = "5000.wav" />
     <Prompt type = "cardinal" name = "NumNewMessages " />
     <Prompt type = "wave" name = "5005.wav" />
```

One of the main problems is that this code assumes that the statement always has a recorded prompt before and a recorded prompt after the variable. However, in some languages the proper translation does not necessarily have this structure. For example, the proper French translation of "You have 5 new messages" could be "5 nouveau messages sont arrivés", where the number of messages occurs before a recorded prompt fragment for "nouveau messages sont arrivés". Exchange Unified messaging is an application that is localized into about 25 different languages so it is important that this all be done properly.

The code enforces a particular ordering that may be counter to the proper translation. So for each variation of structure, there needs to be a code change.

This problem is especially bad if a statement contains several variables, because of the numerous combinations of placement for variables within the statement. For example:

You next meeting is from [Start time] to [end time] for [subject] located in [location].

Consider the following pseudo code example that can handle localizations for playing the statement "You have 5 new messages".

Another big localization problem with this way of writing code for statements is that sometimes parts of the statement change depending on the contents of the variable. Consider the previous example of "You have 5 new messages":

If the variable is "0", then the preferred way of saying the prompt in English may be:

i. "You have no new messages"

If the variable is "1", then the preferred way of saying the prompt in English may be:

i. "You have 1 new message"

If the variable is 2 or greater, then the preferred way of saying the prompt in English may be:

i. "You have [number >2] new messages"

Notice that when the variable value is 0, in English, the actual value of 0 may be substituted with the word "no". Note also that the entire statement could just be one recorded prompt. In the case of the variable value is 1, the word "message" is in singular form. Finally, with variable values of 2 or greater, then the word "messages" is in plural form. Note that this is only for English and that different rules apply for

```
Prompt (type, name)   // Prompt is a function call that will play the target
                      // Type can be either "Wave file" or the kind of variable to be played
                      // name can be a wave file name or a variable name
<!-Comment // 5000.wav contains spoken text "You have">
<!-Comment // 5005.wav contains spoken text "new messages">
<!-Comment // NumNewMessages is a variable containing the number of new messages the
user has received.>
<!-Comment // 6005.wav contains spoken text "nouveau messages sont arrives">
In XML Code:
<Condition value = "Language = English">
     <Prompt type = "wave" name = "5000.wav" />
     <Prompt type = "cardinal" name = "NumNewMessages " />
     <Prompt type = "wave" name = "5005.wav" />
</Condition>
<Condition value = "Language = French">
     <Prompt type = "cardinal" name = "NumNewMessages " />
     <Prompt type = "wave" name = "6005.wav" />
</Condition>
```

Writing code in this way requires developers to have a good knowledge of languages and to specifically know how the structure of each statement will vary in different language. Every time a new language is added to a product, the code has the potential to change for each statement in the application, and must be re-compiled, re-tested, whenever such a change occurs.

different values of numbers, feminine/masculine or words, etc. in other languages.

So different languages may have variations and structure and for each language, there may be variations in structure and content depending on the value of variables. With all of these variations, there is now a lot of localization complexity that the developer must now understand.

```
Prompt (type, name)    // Prompt is a function call that will play the target
                       // Type can be either "Wave file" or the kind of variable to be played
                       // name can be a wave file name or a variable name
In XML Code:
<!-Comment // 5000.wav contains spoken text "You have">
<!-Comment // 5005.wav contains spoken text "new messages">
<!-Comment // 5010.wav contains spoken text "You have no new messages">
<!-Comment // 5015.wav contains spoken text "You have 1 new message">
<!-Comment // NumNewMessages is a variable containing the number of new messages the
user has received.>
<!-Comment // 6005.wav contains spoken text "nouveau messages sont arrives">
<Condition value = "Language = English">
    <Condition value = " NumNewMessages=0">
        <Prompt type = "wave" name = "5010.wav" />
    </Condition>
    <Condition value = " NumNewMessages=1">
        <Prompt type = "wave" name = "5015.wav" />
    </Condition>
    <Condition value = " NumNewMessages<=2">
        <Prompt type = "wave" name = "5000.wav" />
        <Prompt type = "cardinal" name = "NumNewMessages " />
        <Prompt type = "wave" name = "5005.wav" />
    </Condition>
</Condition>
<Condition value = "Language = French">
...
// List all the cases for French
...
</Condition>
<Condition value = "Language=Spanish".
...
// List all the cases for Spanish
...
</Condition>
<Condition value = "Language=Japanese">
...
// List all the cases for Japanese
...
</Condition>
Etc...
```

Advantageously, aspects of the present invention address the foregoing problems. One aspect of a solution is to separate the localization complexity from the code so that it is agnostic to localization changes and additions. This is done by having the code refer to resource strings by using identifiers, rather than referring directly to wave files.

These resource strings contain the statement to be played to users. In general, resource strings are contained in simple text files that localizers are already familiar with in the software development world. They typically work with these resources files by doing "search and replace" operations on text that needs to be translated into different languages.

```
Before
Prompt (type, name)    // Prompt is a function call that will play the target
                       // Type can be either "Wave file" or the kind of variable to be played
                       // name can be a wave file name or a variable name
<!-Comment // 5000.wav contains spoken text "You have">
<!-Comment // 5005.wav contains spoken text "new messages">
<!-Comment // 5010.wav contains spoken text "You have no new messages">
<!-Comment // 5015.wav contains spoken text "You have 1 new message">
<!-Comment // NumNewMessages is a variable containing the number of new messages the
user has received.>
In XML Code:
<Prompt type = "wave" name = "5010.wav" />
After
In XML Code:
Prompt (type, name)    // Prompt is a function call that will play the target
                       // Type can be either "Wave file" or a "resource string" or the kind of
                           variable
                       // name can be a wave file name or a variable name or the ID of a
                           Resource
<Prompt type = "ResourceString" name = "idsNoNewMessages" />
In Localizable resource string file:
idsNoNewMessages = You have no new messages
```

When a statement also contains variables, then the Code needs to add the variable as a parameter. The resource string also needs to include a placeholder to indicate where in the text the contents of the variable should be included. This is done with parameter indicators such as "{0}" or "{1}" the resource string file is can be changed or re-ordered to accommodate variations in language and structure.

Another step to this solution is to address statements whose wording changes depending on the value of a contained variable. For this case, a new class of resource strings describes

---

```
Before
Prompt (type, name)   // Prompt is a function call that will play the target
                      // Type can be either "Wave file" or the kind of variable to be played
                      // name can be a wave file name or a variable name
<!-Comment // 5000.wav contains spoken text "You have">
<!-Comment // 5005.wav contains spoken text "new messages">
<!-Comment // 5010.wav contains spoken text "You have no new messages">
<!-Comment // 5015.wav contains spoken text "You have 1 new message">
<!-Comment // NumNewMessages is a variable containing the number of new messages the
user has received.>
In XML Code:
    <Prompt type = "wave" name = "5000.wav" />
    <Prompt type = "TTS" name = "NumNewMessages " />
    <Prompt type = "wave" name = "5005.wav" />
After
In XML Code:
Prompt (type, name)   // Prompt is a function call that will play the target
                      // Type can be either "Wave file" or a "resource string" or the kind of
                          variable
                      // name can be a wave file name or a variable name or the ID of a
                          Resource
<Prompt type = "ResourceString" name = "idsNewMessages">
    <PromptVariable type="cardinal" name="NumNewMessages"/>
</Prompt>
In Localizable resource string file:
idsNewMessages = You have {0} new messages
```

---

In this embodiment, to play statements to the user, the system will first inspect the text in the resource string for parameter indicators to determine how many wave files there need to be. In this case, there are two wave files and 1 parameter. The system will then look for wave files on the file system that have the same name as the resource identifier and play them. In this example, the system looks for idsNewMessages_A.wav (which would contain the text "You have") and idsNewMessages_B.wav (which should contain the text "new messages"). The system will also properly insert the variable during playing based on the position the parameter indicator.

Using this scheme, the code only refers to resource string ID's and does not have to change for localization. The text in the different possible variations (per language) and a "key" describes the variable that will change the prompt. For that new class, the different kinds of variations are defined.

For example, for the case of numbers, special cases for Singular (1), Plural (2 or more), and zero (0) may be used. So aspects of the invention define a new localizable number resource and the regular expressions that characterize each of these cases for values of the "key".

"Singular" here means the value is 1. "Plural" means that is anything that start with 2 to 9 and has any number of digits after, or starts with 1 and has at least 1 digit after. Finally, our zero or "Alternative" case is when the value is 0. In addition to the definition, a suffix added to the resource string ID locates the appropriate files.

---

```
<PromptTypeDef name="NumberResourceString" key = "Number">
    <Variation regex="[1]" suffix= "_Singular"/>
    <Variation regex="[2–9][\d]* | [1][\d]+" suffix= "_Plural"/>
    <Variation regex="[0]" suffix= "_Alternative"/>
</Prompt>
Before
Prompt (type, name)   // Prompt is a function call that will play the target
                      // Type can be either "Wave file" or the kind of variable to be played
                      // name can be a wave file name or a variable name
<!-Comment // 5000.wav contains spoken text "You have">
<!-Comment // 5005.wav contains spoken text "new messages">
<!-Comment // 5010.wav contains spoken text "You have no new messages">
<!-Comment // 5015.wav contains spoken text "You have 1 new message">
<!-Comment // NumNewMessages is a variable containing the number of new messages the
user has received.>
In XML Code:
<Condition value = " NumNewMessages=0">
    <Prompt type = "wave" name = "5010.wav" />
</Condition>
```

-continued

```
<Condition value = " NumNewMessages=1">
    <Prompt type = "wave" name = "5015.wav" />
</Condition>
<Condition value = " NumNewMessages<=2">
    <Prompt type = "wave" name = "5000.wav" />
    <Prompt type = "cardinal" name = "NumNewMessages "/>
    <Prompt type = "wave" name = "5005.wav" />
</Condition>
After
In XML Class Definition
<PromptTypeDef name="NumberResourceString" key = "Number">
    <Variation regex="[1]" suffix= "_Singular"/>
    <Variation regex="[2–9][\d]* | [1][\d]+" suffix= "_Plural"/>
    <Variation regex="[0]" suffix= "_Alternative"/>
</Prompt>
In XML Code:
Prompt (type, name)   // Prompt is a function call that will play the target
                // Type can be either "Wave file" or a "resource string" or the kind of variable
                         // name can be a wave file name or a variable name or the ID of a
Resource
<Prompt type = "NumberResourceString" name = "idsNewMessages"
key="NumNewMessages">
    <PromptVariable type="cardinal" name="NumNewMessages"/>
</Prompt>
In Localizable resource string file:
idsNewMessages_Singular = You have 1 new message
idsNewMessages_Plural = You have {0} new messages
idsNewMessages_Alternative = You have no new messages
```

For this step, in order for the system to play statements, it first looks at the type of the prompt. In this case, it is a "NumberResourceString". When looking at the number resource string, several expressions may be compared to the key value. If for example, the "NumNewMessages" was 5, then the definition matches the expression to the "Plural" definition and the suffix is "_Plural". A resource string file, in this case named "idsNewMessage_Plural" includes the appropriate ID.

The rest is the same as for other statements. The system will inspect the text in the resource string (idsNewMessagse_Plural) for parameter indicators to determine how many wave files there need to be. In this case, there are two wave files and 1 parameter. The system will then look for waves on the file system that have the same name as the resource identifier and play them. In the example, the system looks for idsNewMessages_Plural_A.wav (which would contain the text "You have") and idsNewMessages_Plural_B.wav (which should contain the text "new messages"). The system will also properly insert the variable during playing based on the position the parameter indicator.

EXAMPLE 2

This example describes how prompts with multiple fragments are played in the system. These prompts usually contain several prompt fragments and variables to convey an idea. One fragment is played, then the contents of a variable, such as the subject of an email, are played (usually through the text-to-speech engine), then additional prompt fragments and variables are played. There are many possible prompts for use with multiple fragments. These prompts are more difficult to localize, because translating them properly may require re-arranging the fragments and variables.

For multiple fragments wave files are not directly referenced; instead the XML code refers to localizable strings. In addition, variables that are part of the prompt must also be specified. This is shown as an example below for the prompt "Unread Message from [caller name] subject reads [subject text]. Received [Received Date and Time]".

XML Code

```
Before:
    <Condition value = "IsUnread(emailMessage)">
        <Prompt type = "wave" name = "4001a.wav" />
        <Prompt type = "text" name = "displayName" />
        <Prompt type = "wave" name = "4001b.wav" />
        <Prompt type = "text" name = "subject" />
        <Prompt type = "wave" name = "4001c.wav" />
        <Prompt type = "date-time" name = "receivedDateTime" />
    </Condition>
After:
    <Condition value = "IsUnread(emailMessage)">
        <Prompt type = "locString" name = "idsUnreadEmailHeader">
            <PromptVar type = "text" name = "displayName" />
            <PromptVar type = "text" name = "subject" />
            <PromptVar type = "date-time" name = "receivedDateTime" />
        </Prompt>
    </Condition>
```

In the resource file, the resource string is defined with the text as well as the placement of variables. An example is shown below.

```
Resource file: "Prompts.Strings.Locstrings"
    idsUnreadEmailHeader = Unread message from {0},
    subject reads {1}. Received {2}.
```

Like for basic prompts, the system will inspect the text in the loc string to determine how many wave files there should be. In this case, inspecting the loc string reveals that there are three wave files and three variables.

The system will then look for waves on the file system that start with the name of the resource, followed by a letter to denote it's place in the prompt. In our example, the related filenames are:

| Filename | Contents |
| --- | --- |
| idsUnreadEmailHeader_a.wav | Unread message from |
| idsUnreadEmailHeader_b.wav | subject reads |
| idsUnreadEmailHeader_c.wav | Received |

If any of the files do not exist, then the system will use Text-To-Speech to play the prompt.

The exemplary operating environment illustrated in FIG. 1 includes a general purpose computing device (e.g., computing device 102) such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices (not shown) may be connected to the computing device. A monitor or other type of display device (not shown) is also connected to the computing device. In addition to the monitor, computers often include other peripheral output devices (not shown) such as a printer and speakers, which may be connected through an output peripheral interface (not shown).

The computer 102 may operate in a networked environment using logical connections to one or more remote computers. The remote computer may be a personal computer, a server (e.g., servers 108, 124), a router, a network PC, a peer device or other common network node, and typically includes many or all of the elements described above relative to computer 102. Such networking environments are commonplace in offices, enterprise-wide computer networks, intranets, and global computer networks (e.g., the Internet).

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer 102 executes code for determining that a prompt statement specifies a resource string. If the prompt statement is a resource string type, the computer 102 identifies a resource string for the prompt statement that corresponds to a NAME variable. A media file that corresponds to the identified resource string is retrieved, and rendered in response to the prompt statement.

Wherein a KEY variable is associated with a prompt statement, Computer 102 also executes code for determining that the prompt statement specifies a resource string and identifying a grammar variable that corresponds to the KEY variable. Computer 102 further executes code concatenating the grammar variable to the NAME variable and identifying a resource string for the prompt statement that corresponds to the NAME variable.

In one embodiment, Exchange Unified Messaging code executed by computer 102 may be comprised of call control, voice media processing, fax media processing, a TTS engine, and a speech recognition engine. Code for playing spoken prompts may reside as a component of the Exchange Unified Messaging application.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above systems and methods without departing from the scope of the invention, it, is intended that all matter contained in the above description and shown in the accompanying drawings shall be interpreted as illustrative and not in a limiting sense.

What is claimed is:

1. A computer-implemented method for executing, by a processor of a computing device, a prompt statement, the prompt statement having a NAME variable associated therewith, the method comprising:
   determining that the prompt statement specifies a resource string, wherein the resource string includes a personal information manager variable, and wherein the personal information manager variable is a KEY variable;
   identifying a grammar variable that corresponds to the KEY variable;
   concatenating the grammar variable to the NAME variable;
   identifying, by the processor, a resource string for the prompt statement that corresponds to the NAME variable;
   retrieving a media file that corresponds to the identified resource string; and
   rendering the retrieved media file that corresponds to the resource string in response to the prompt statement and rendering, in a speech-to-text format, the personal information manager variable, said rendering occurring in an order specified by the resource string.

2. The computer-implemented method of claim 1, wherein the media file is a localized audio recording representative of the resource string.

3. The computer-implemented method of claim 1, further comprising rendering the resource string in a text-to-speech format if no media file is retrieved that corresponds to the resource string.

4. The computer-implemented method of claim 1, wherein the resource string comprises a text string of a localized language.

5. The computer implemented method of claim 4, wherein the text string is translated into a non-English language.

6. The computer-implemented method of claim 1, wherein the grammar variable modifies one or more plural forms contained in the resource string associated with the NAME variable.

7. The computer-implemented method of claim 1, wherein the resource string is grammatically correct for the language of the text.

8. The computer-implemented method of claim 7, wherein the personal information manager information is information selected from the group consisting of email messages, voicemail messages, calendar appointments, and personal contact details.

9. The computer-implemented method of claim 1, wherein the media file and the text-to-speech format have the same gender.

10. The computer-implemented method of claim 1, wherein the resource string provides personal information manager information.

11. The computer-implemented method of claim 1, wherein one or more computer-readable storage media have stored thereon the computer-executable instructions for performing the computer-executable method of claim 1.

12. A computer-implemented method for executing, by a processor of a computing device, a prompt statement having a NAME variable and a KEY variable associated therewith, said method comprising:
    determining that the prompt statement specifies a resource string;
    identifying, by the processor a grammar variable that corresponds to the KEY variable;
    concatenating the grammar variable to the NAME variable; and identifying a resource string for the prompt statement that corresponds to the NAME variable.

13. The computer-implemented method of claim 12, further comprising:
    retrieving one or more media files that correspond to the resource string; and
    rendering the retrieved media files in response to the prompt statement.

14. The computer-implemented method of claim 13, wherein the resource string is grammatically correct for numeric value of the KEY variable and the language of the text.

15. The computer-implemented method of claim 13, wherein the media file is a localized audio recording representative of the resource string.

* * * * *